United States Patent [19]
Neiman et al.

[11] 3,748,932
[45] July 31, 1973

[54] METHOD AND APPARATUS FOR REMOVING INSULATION FROM WIRES INTERMEDIATE THE ENDS THEREOF

[75] Inventors: Richard Alvin Neiman, Harrisburg; Glendon Henry Schwalm, Camp Hill, both of Pa.

[73] Assignee: AMP Incorporated, Harrisburg, Pa.

[22] Filed: Feb. 9, 1972

[21] Appl. No.: 224,851

[52] U.S. Cl. .............................. 81/9.51, 29/203 R
[51] Int. Cl. ............................................. H02g 1/12
[58] Field of Search .................... 81/9.51; 29/203 R

[56] References Cited
UNITED STATES PATENTS
| | | | |
|---|---|---|---|
| 1,753,561 | 4/1930 | Emmert | 81/9.51 |
| 2,413,192 | 12/1946 | Pope | 81/9.51 |
| 3,364,801 | 1/1968 | Johnston | 81/9.51 |
| 3,657,795 | 4/1972 | MacKay | 81/9.51 |

*Primary Examiner*—Harold D. Whitehead
*Assistant Examiner*—Roscoe V. Parker
*Attorney*—William J. Keating, Frederick W. Raring et al.

[57] ABSTRACT

Apparatus for removing insulation from wires intermediate the wire ends comprises insulation slitting knives which axially slit in the area from which insulation is to be removed and insulation cutting and removing blades spaced from the slitting knives. The insulation cutting and stripping blades are movable towards each other and into engagement with the wire to form circumferential cuts in the insulation at each end of the previously formed slits. Thereafter, the two pairs of insulation cutting and removing blades move toward each other along the wire axis to compress and arch the segments of insulation and separate them from the metallic core of the wire.

9 Claims, 15 Drawing Figures

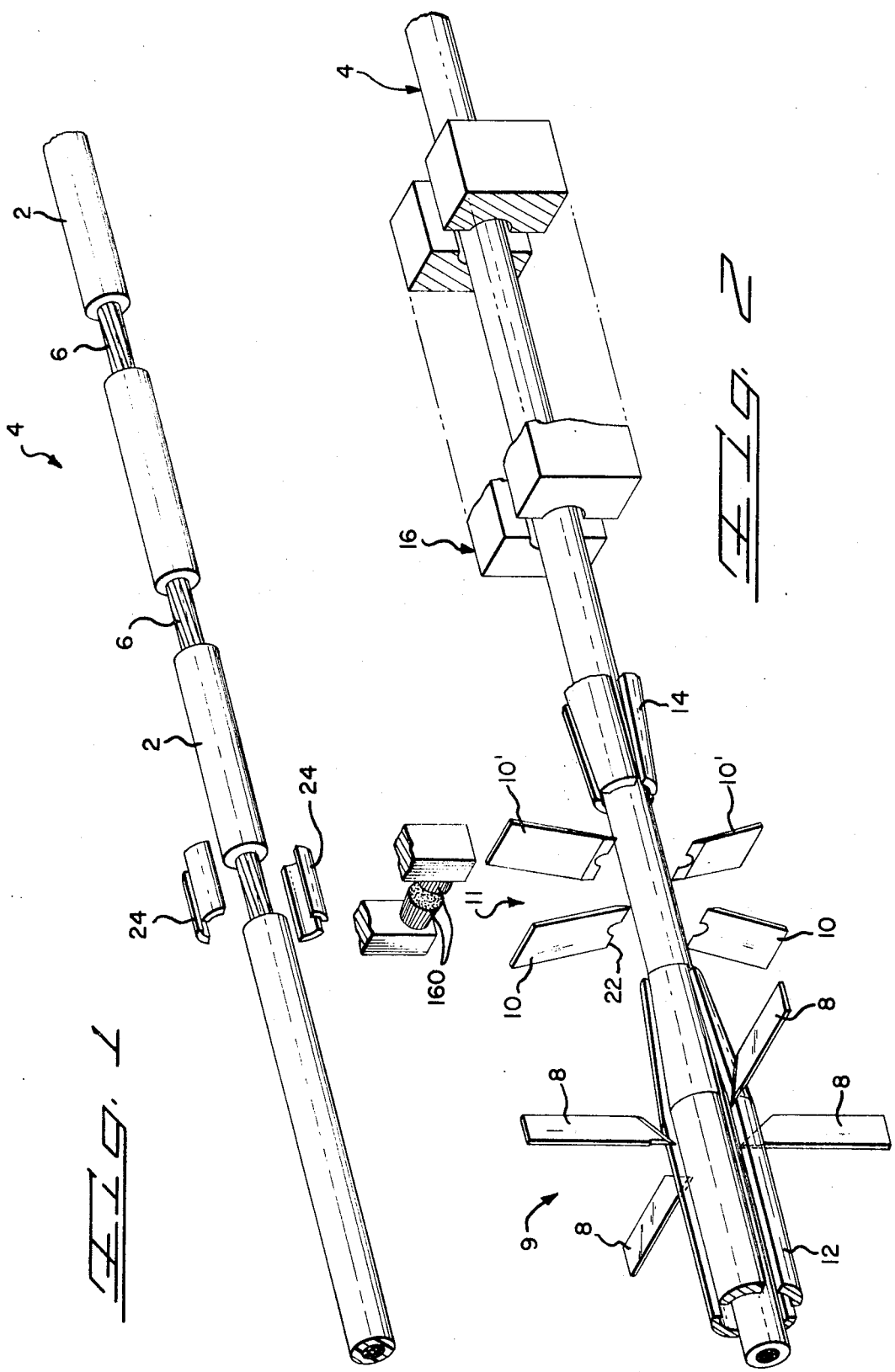

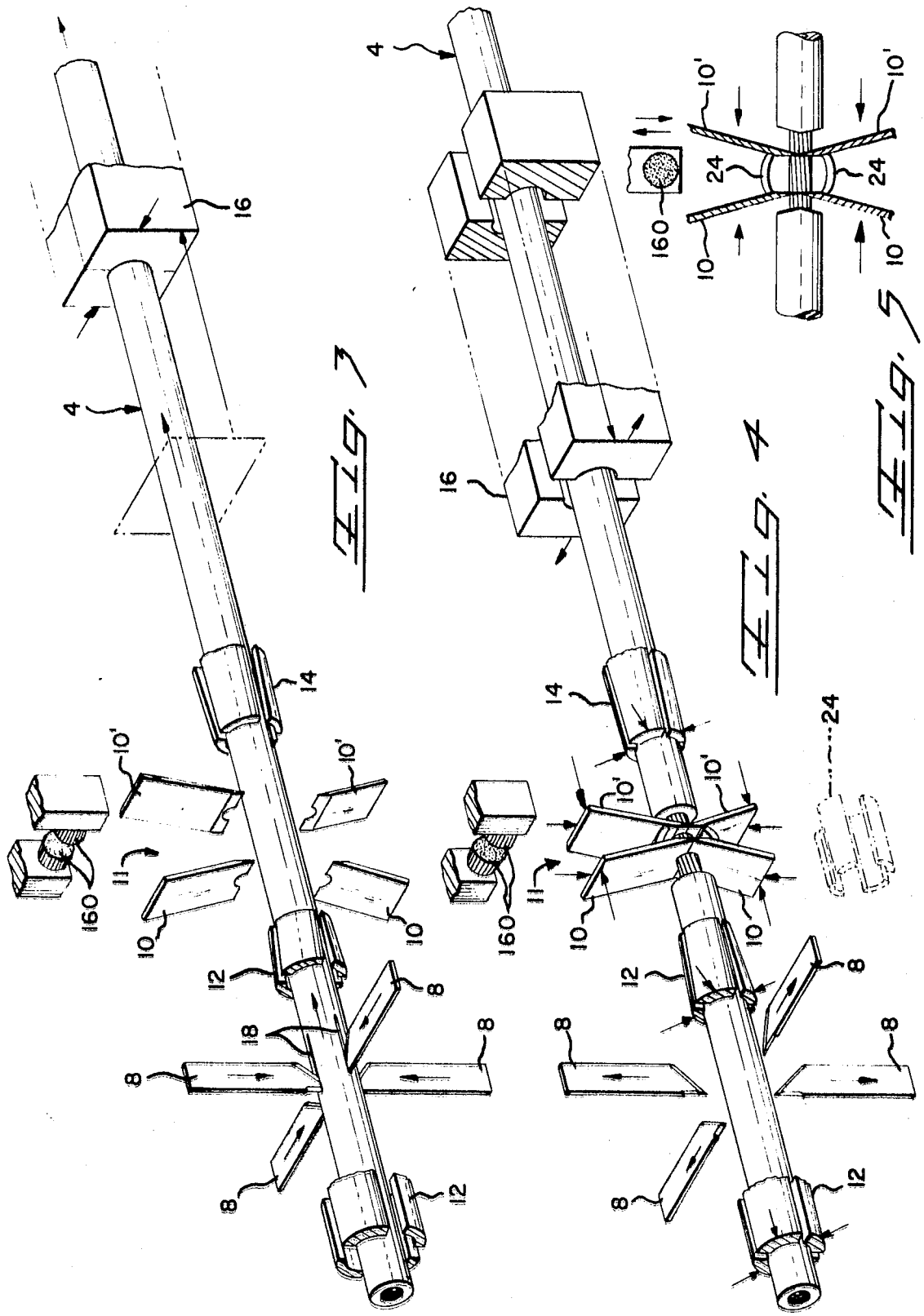

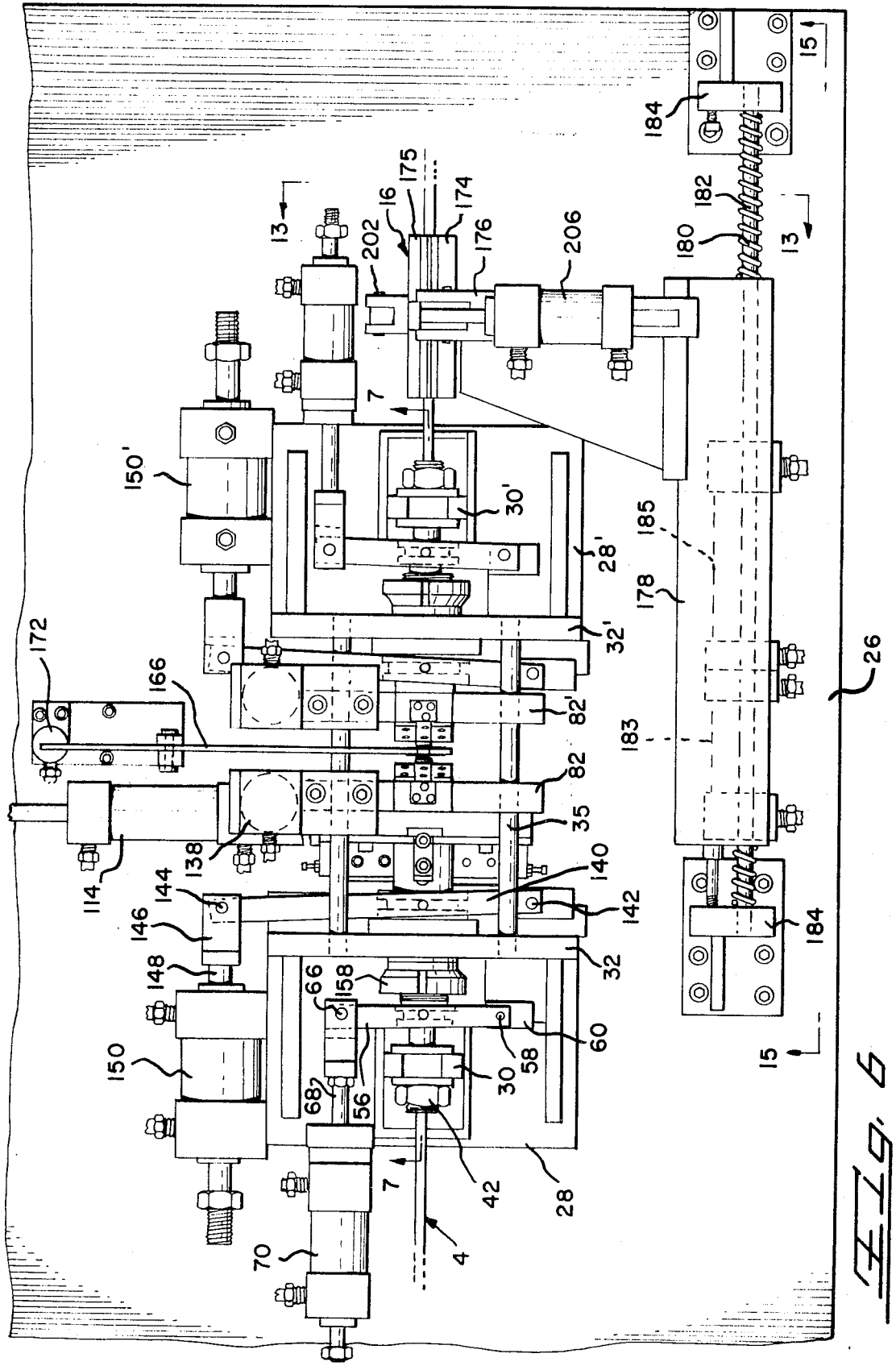

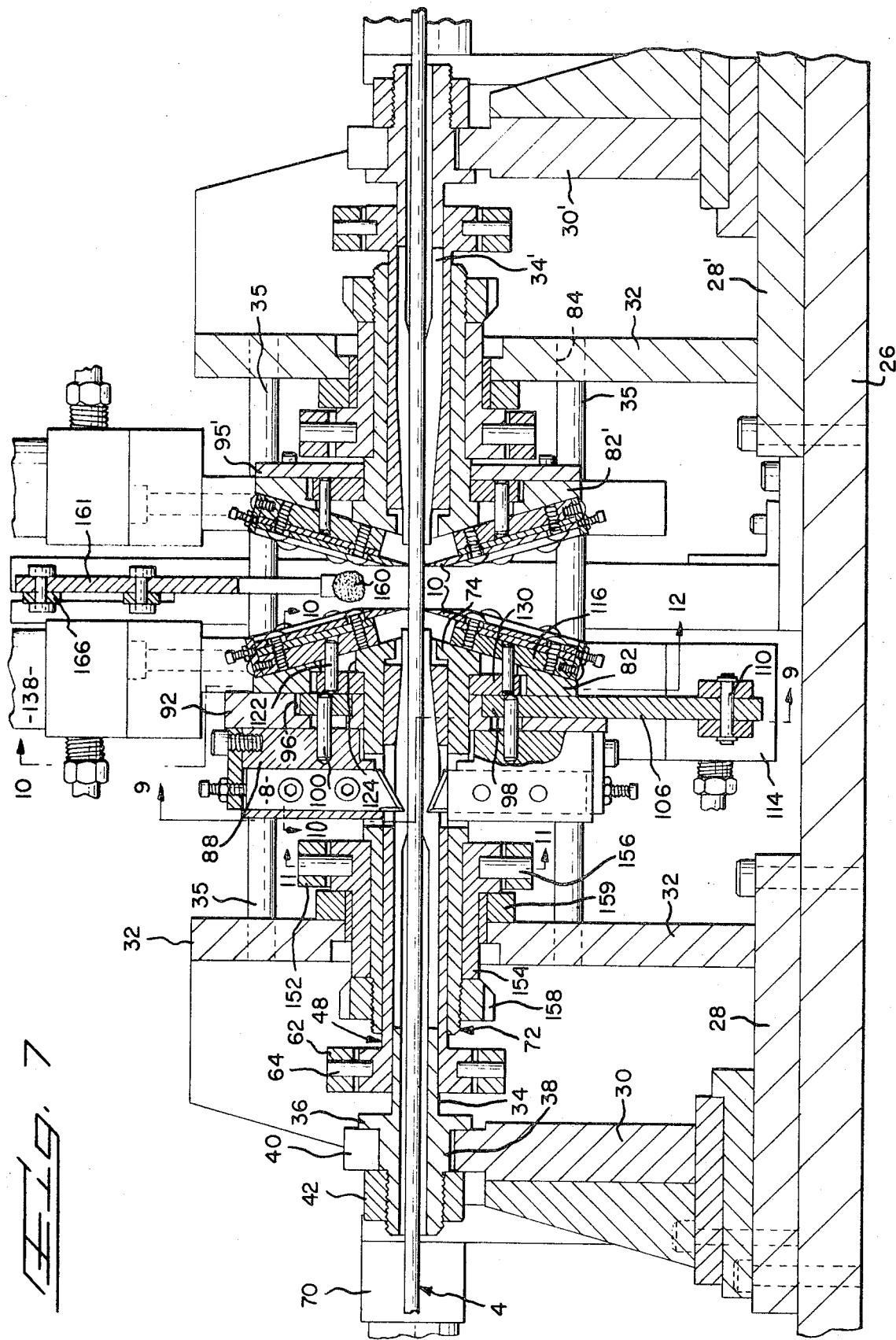

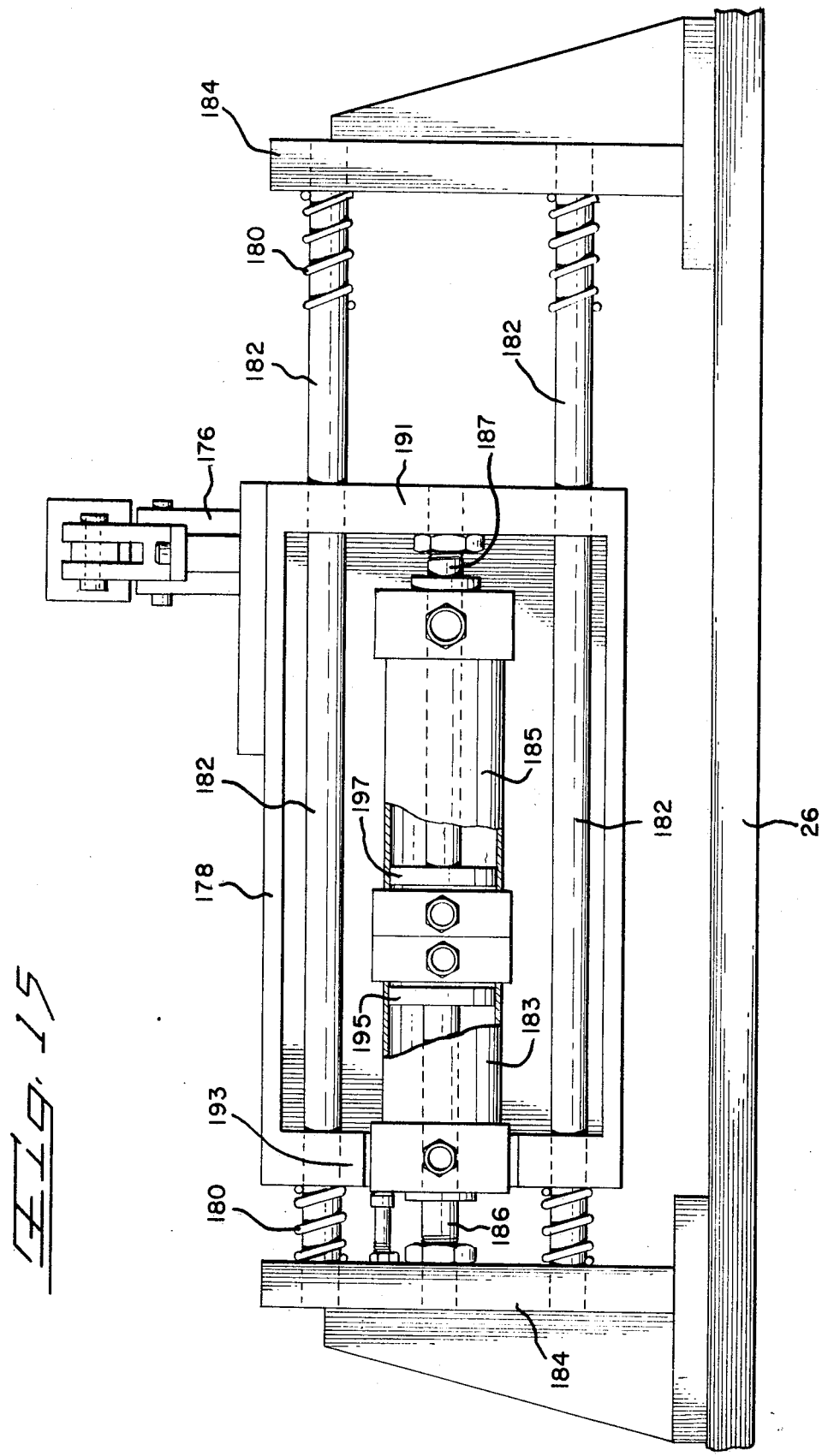

METHOD AND APPARATUS FOR REMOVING INSULATION FROM WIRES INTERMEDIATE THE ENDS THEREOF

BACKGROUND OF THE INVENTION

It is sometimes desirable, in harness manufacturing operations, to remove insulation from wires intermediate the ends thereof in order to permit crimping of a terminal onto the intermediate wire portion. Several machines have been proposed for insulation stripping operations of this type and while many of these machines are entirely satisfactory for specific types of wire, it has been found that they will not operate satisfactorily on a wide variety of wires. In a harness making operation, many different types of wires with many different types of insulation are commonly used and an insulation stripping machine, to be truly useful to the harness manufacturer, must be capable of removing several types of insulation. Some types of insulation can be removed from wires with relative ease while other types are very tenacious and will resist removal from the wire.

The instant invention is therefore directed to the achievement of an improved insulation stripping machine for removing insulation from wires intermediate the ends thereof. It is an object of the invention to provide an improved stripping machine capable of removing a variety of types of insulation from the wires intermediate the wire ends. A further object is to provide an insulation stripping machine having means for slitting the insulation to be removed axially and cutting the insulation circumferentially in combination with a means for positively engaging the segments formed to remove them from the wire. A still further object is to provide a machine which is rapid and reliable and which can be rapidly adjusted for different wire types and sizes.

These and other objects of the invention are achieved in a preferred embodiment thereof which is briefly described in the foregoing abstract, which is described in detail below, and which is shown in the accompanying drawing in which:

FIG. 1 is a perspective view of a length of wire having insulation removed therefrom at periodic intervals and illustrating the manner in which the insulation is cut during removal in accordance with the instant invention.

FIG. 2 is a view similar to FIG. 1 showing some of the elements of an apparatus in accordance with the invention including the insulation slitting knives, the insulation cutting and removing blades, the means for feeding the wire from the slitting station to the insulation removing station, and portions of collets which grip the wire during the insulation removing operation, this view showing the position of the parts at the beginning of the operating cycle of the apparatus.

FIG. 3 is a view similar to FIG. 2 illustrating the manner in which the insulation is slit by the slitting knives.

FIG. 4 is a view similar to FIG. 3 but illustrating the manner of circumferentially cutting of the insulation and the removing it from the wire.

FIG. 5 is a fragmentary view illustrating the action of the insulation cutting and removing blades.

FIG. 6 is a top plan view of an apparatus in accordance with the invention.

FIG. 7 is a sectional frontal view of the apparatus.

FIGS. 9, 10, 11, and 12, are views taken along the lines 9—9, 10—10, 11—11, and 12—12 of FIG. 7.

Figure 13:
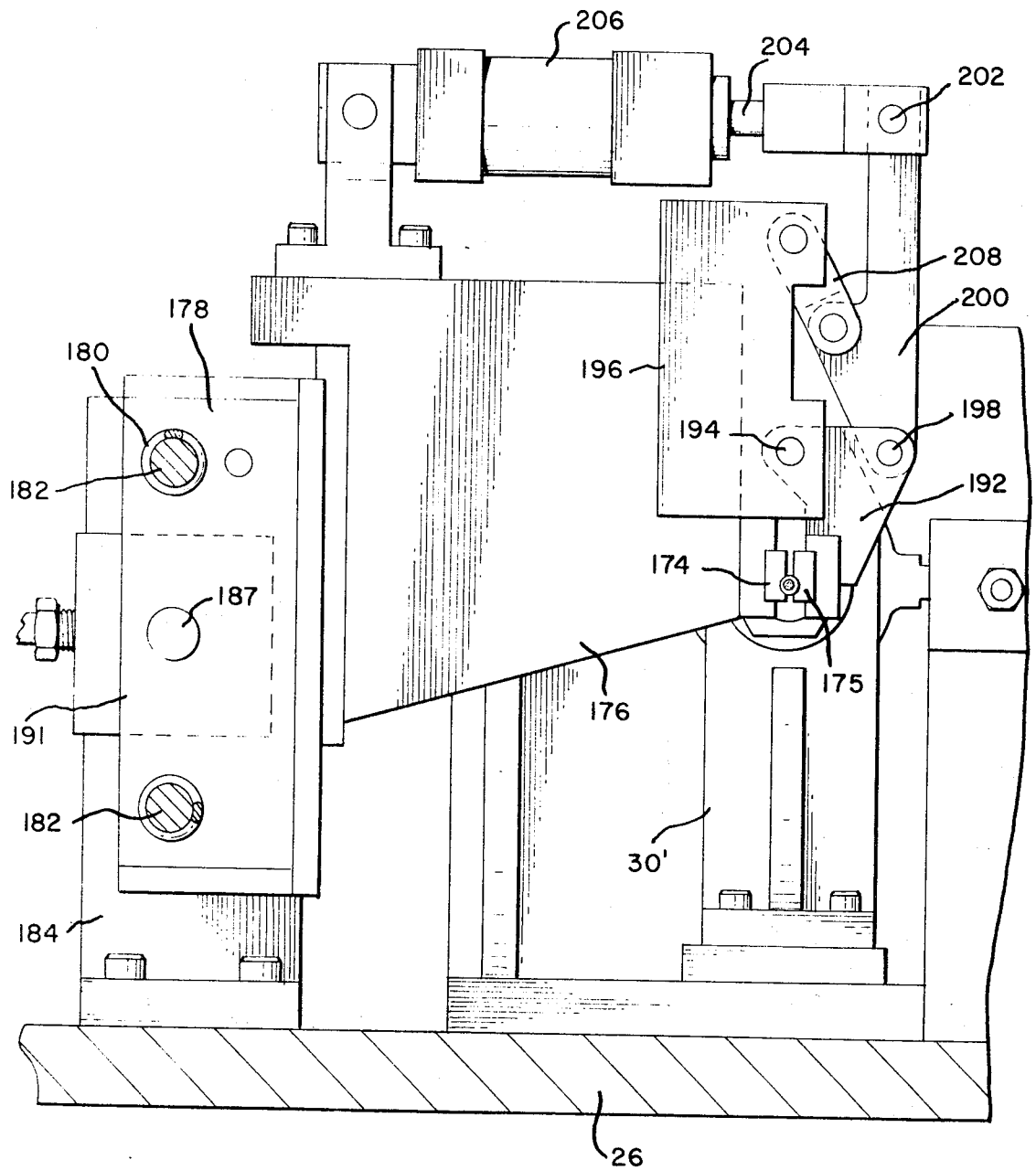
Figure 14:
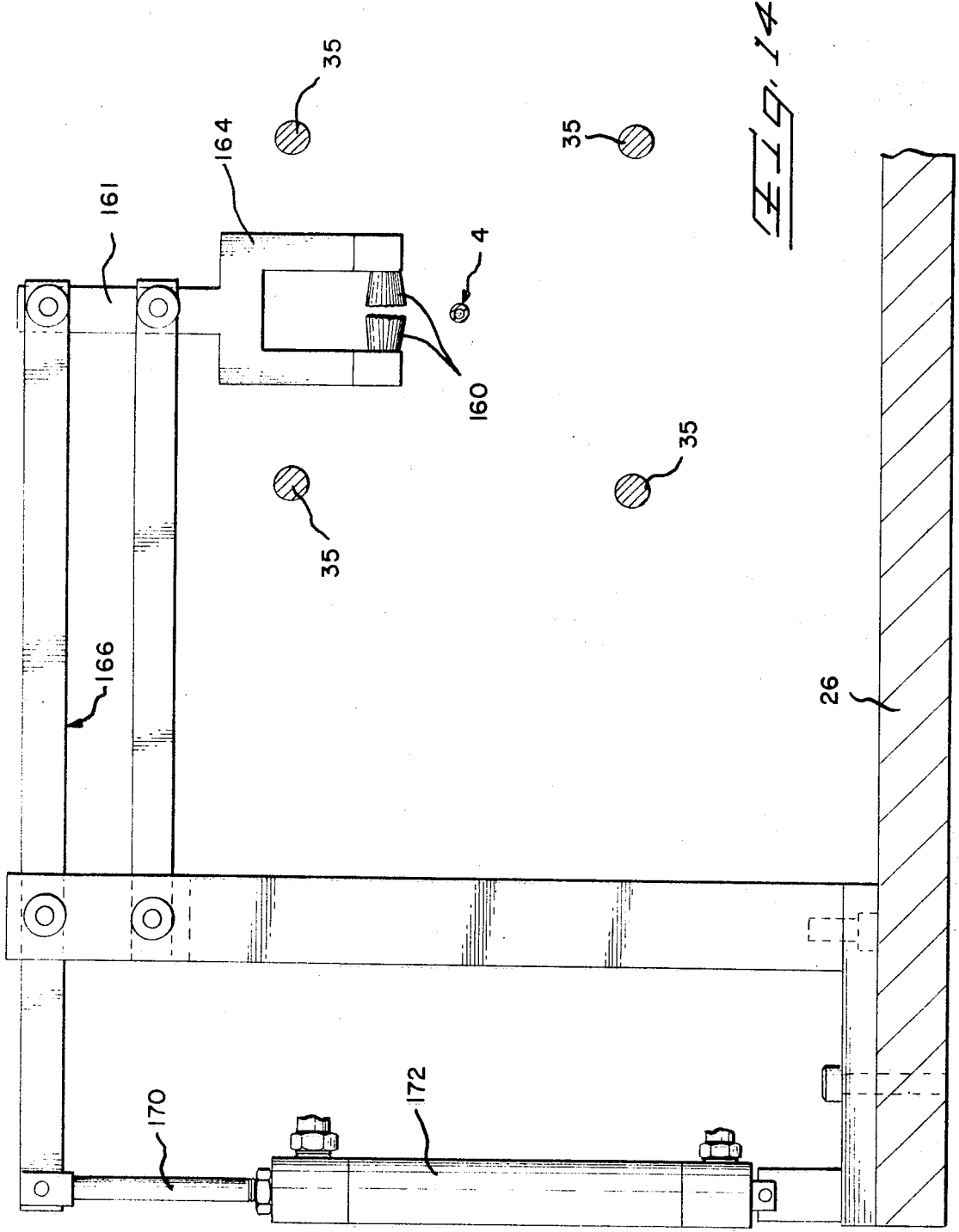

FIG. 13, 14, and 15 are views taken along the lines 13—13, 14—14, and 15—15 of FIG. 6.

The operating principles of an apparatus in accordance with the invention are illustrated in FIGS. 1-5 in which the reference numeral 2 notes an insulated wire 4 having insulation removed at spaced intervals 6 therealong. The insulation is stripped from the wire by first cutting four axial slits 18 in the wire in the area from which the insulation is to be removed by means of insulation slitting knives 8. These knives move radially towards the wire through slots in a collet 12 until they penetrate the insulation. The wire is thereafter fed rightwardly a short distance to form the slits of the desired lengths. Thereafter, the blades 8 are retracted and the wire is fed an additional short distance until the axial slits 18 are disposed between two pairs of insulation cutting blades 10—10 and 10'—10 . These blades are moved diagonally towards the wire axis until they form circumferential cuts in the insulation at each end of the slits 18. The blades thereafter move towards each other as shown in FIGS. 4 and 5 to cause the four individual segments of insulation to be flexed outwardly as shown at 24 in FIG. 5 whereby they will be separated from the wire and will fall free from the apparatus. As will be explained below, brushes may also be provided for removing the segments in case they are not thoroughly removed or completely removed by the 10, 10'. Feeding of the wire for the short distance from the insulation slitting zone 9 to the insulation removing zone 11 is accomplished by reciprocable clamping blocks generally indicated at 16 which engage the wire and move it rightwardly as illustrated in FIG. 3.

Referring now to FIGS. 6 and 7, a preferred embodiment of the invention is supported on a static frame comprising a base plate 26, spaced apart support plates 28, 28' which are mounted on the base plate, vertical supports 30, 32 at the lefthand end of the apparatus and 32', 30' at the righthand end of the apparatus. Additional stationary supports are provided as will be described below. It should be noted at this point that the apparatus is generally symmetrical with respect to its vertical center line as viewed in FIG. 7 excepting that insulation slitting knives 8 are mounted on the lefthand side of the apparatus and no corresponding knives are mounted on the righthand side. Accordingly, the following description is directed primarily to the structural elements on the lefthand side of the apparatus as viewed in FIG. 7 and the same reference numerals, differentiated by prime marks, will be used for corresponding structural elements on the left and righthand sides. Specific reference will be made to the structural elements on the righthand side of the apparatus where appropriate.

The wire is fed through and supported in, the apparatus by means of aligned collets 34, 34'. The collet 34 (FIG 8) has a radially extending collar 36 adjacent to its lefthand end and has a formed portion 38 adjacent to this collar which is adapted to enter a notch 40 on the upper end of the vertical support member 30. Collet 34 is held on the support member by means of a nut 42 which is threaded onto the threaded lefthand end of the collet so that the collet projects, cantilever fashion, rightwardly towards the center of the apparatus.

Collet 34 has a conically tapered righthand end 44 and is provided with four axially extending slots 46 spaced at equal circumferential intervals and extending leftwardly for a substantial distance so that the segments of the collet separated by these slots can be flexed inwardly into clamping engagement with the wire. These slots are of a width sufficient to admit passage of the insulation slitting knives therethrough as will be described below.

Figure 8:
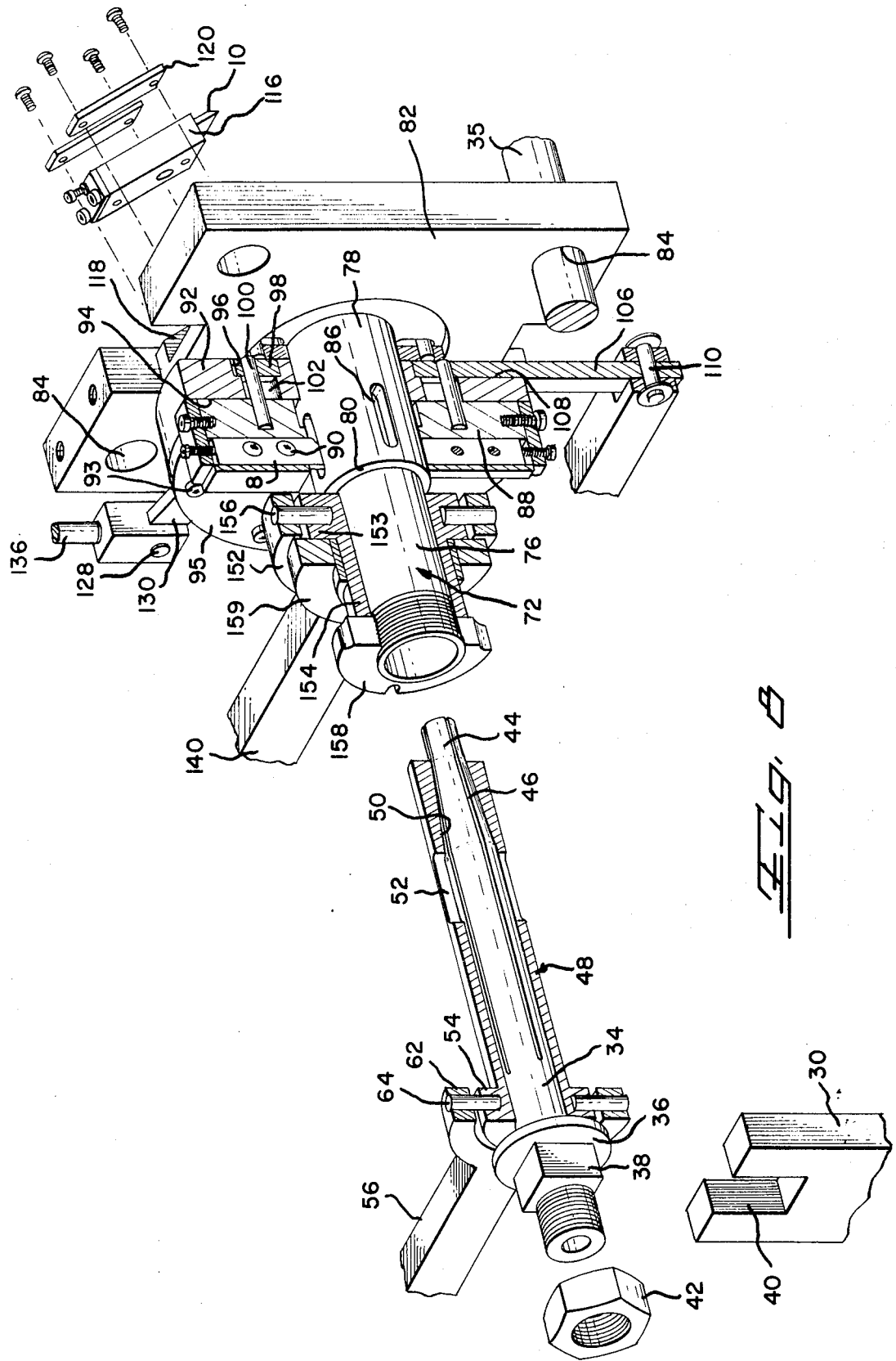
FIG. 8 is a perspective view, with some parts exploded, of one portion of the apparatus of FIG. 6 illustrating the arrangement and mounting of the insulation slitting knives and the insulation cutting blades on one side of the apparatus.
Figure 9:
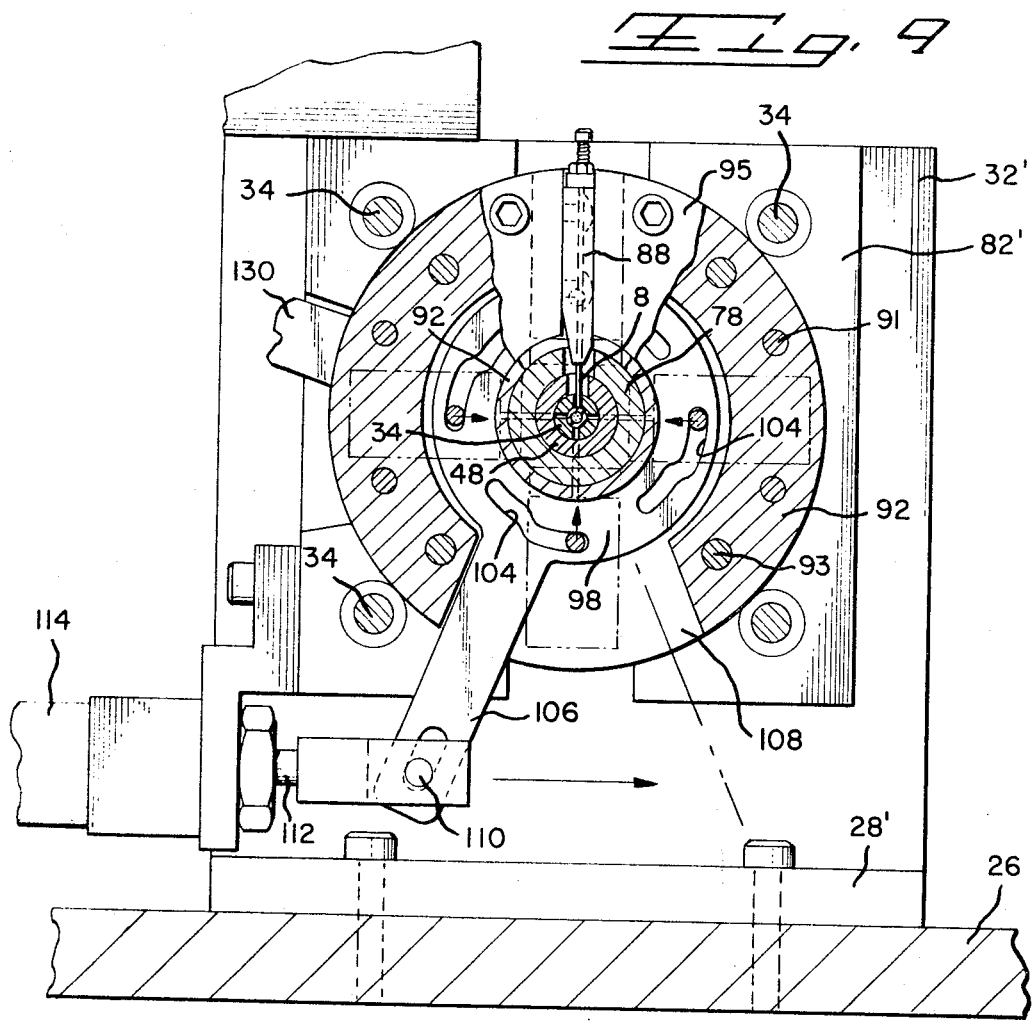

A cylindrical clamping sleeve 48 surrounds the collet 34 and has a conical inner surface 50 at its righthand end as viewed in FIG. 8 so that upon leftward movement of the sleeve, the fingers formed by the slots 46 will be flexed inwardly. Clamping sleeve 48 is also provided with four radially extending slots 52 in alignment with the slots 46 to permit passage of the insulation slitting knives and portions of the insulation slitting knife holders therethrough. On its lefthand end, the clamping sleeve 48 has a radially extending collar 54 which is pivotally connected by means of radially extending pins 64 to a ring 62. This ring is integral with a lever 56 that is pivoted at 58 on the forward side of the apparatus and is pivotally connected at its rearward end 66 to a piston rod 68 extending from a pneumatic piston cylinder 70. It will thus be apparent from FIGS. 6 and 8 that upon leftward movement of the piston rod 68, lever 56 will be swung through a sight counterclockwise arc about its pivotal axis 58 thereby to move the clamping sleeve leftwardly and flex the collet fingers into engagement with the wire. Rightward movement of the piston rod 68 will move the clamping sleeve rightwardly with respect to the collet 34 and disengage the collet from the wire.

The previously identified insulation slitting blades 8 and the insulation cutting knives 10 are mounted in surrounding relationship to the collet 34 by means of a mounting sleeve generally indicated at 72 and best shown in FIGS. 7 and 8. This mounting sleeve has a cylindrical portion 76 at its lefthand end, a leftwardly facing shoulder 80 intermediate its ends, a cylindrical portion 78 of slightly greater diameter than portion 76 and a relatively large square flange 82 on its righthand end. As best shown in FIG 7, sleeve 72 is slidably mounted on the clamping sleeve 48 and inwardly directed lips 74 are provided at the righthand end of the mounting sleeve to limit leftward movement of the mounting sleeve with respect to the clamping sleeve 48. The flange 82 has holes 84 adjacent to its four corners through which guide rods 35 extend, these guide rods having their ends supported in the vertical support members 32, 32'. Axially extending slots 86 are provided in the portion 78 of the mounting sleeve in alignment with the slots 52 and slots 46 for permitting passage of the insulation slitting knives 8 therethrough in a manner which is described below.

Figure 10:
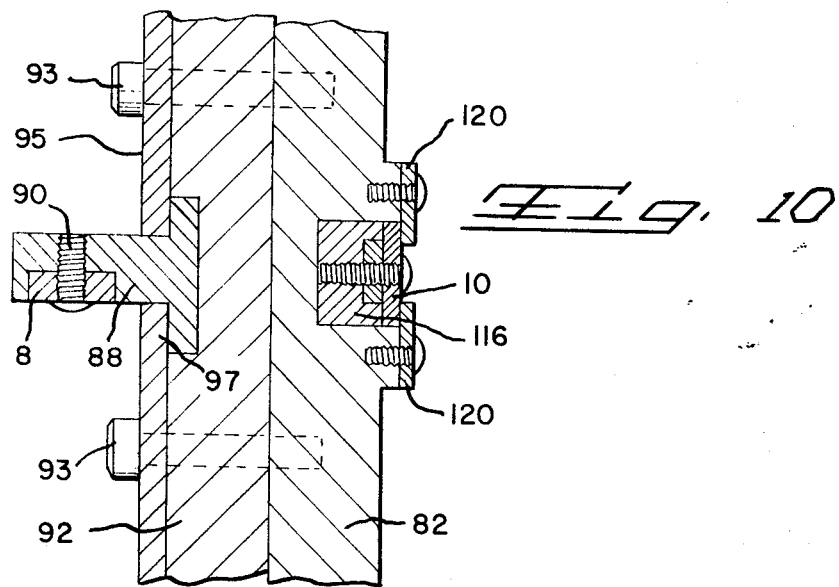
Figure 12:
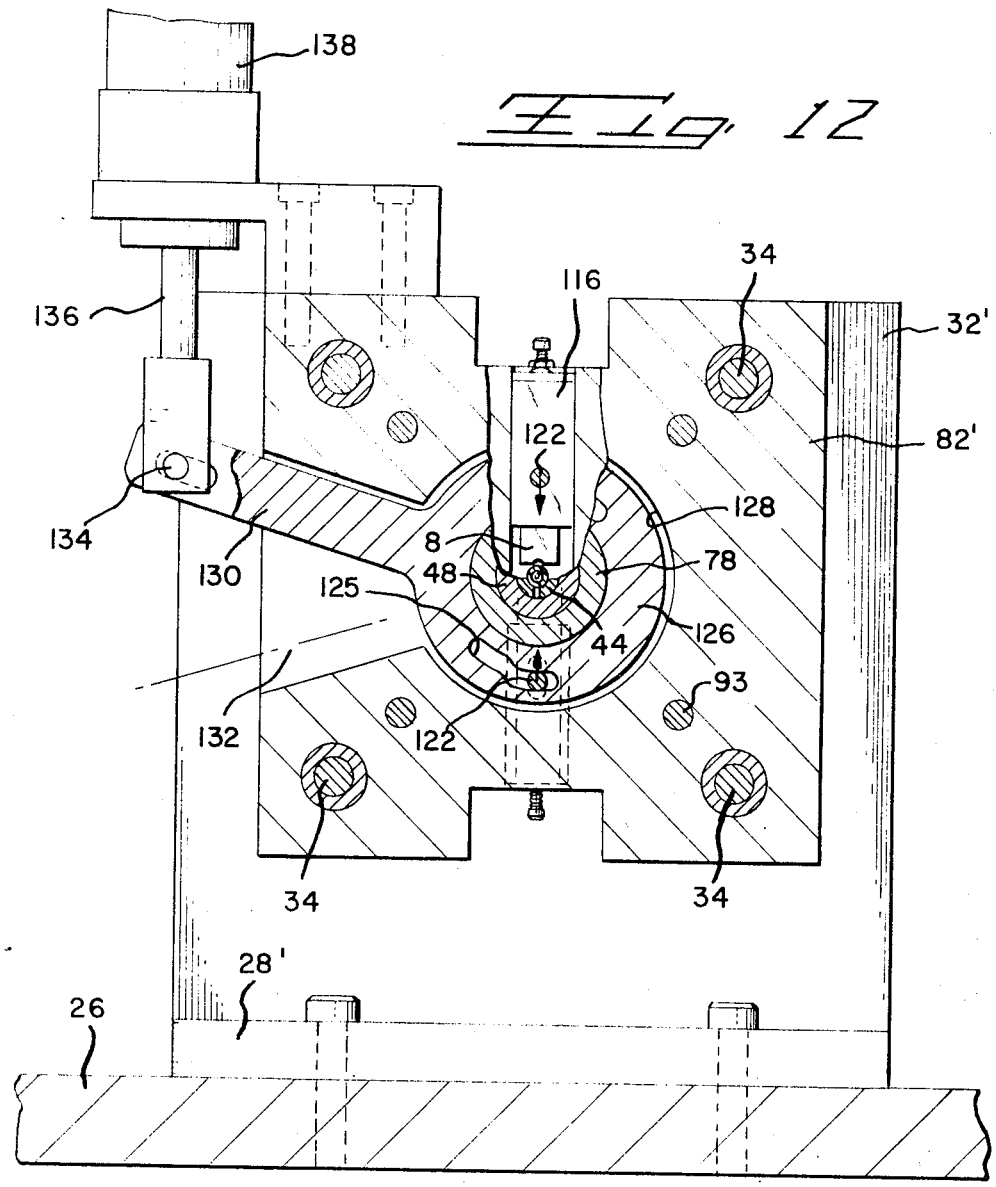
Figure 11:
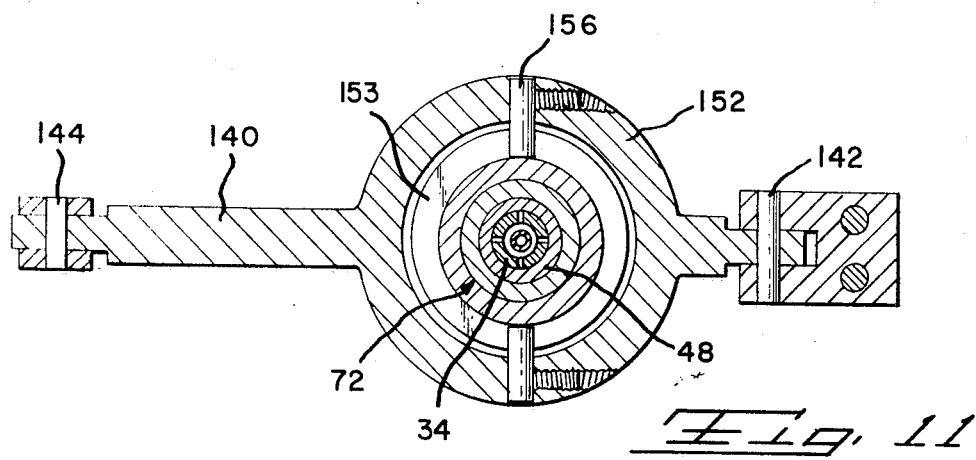

The insulation slitting knives 8 are secured in slots in knife holders 88 by means of screw 90, see FIG 10. The knife holders have T-shaped cross-sections and are slidably mounted in grooves or slots on the leftwardly facing side of a knife holder ring 92. Four cover plates 95 in the form of quadrants are secured against the face of ring 92 by screws 93, these quadrants having side portions 97 which overlap the knife holders 88 to retain them in their slots. The knife holder ring is secured to the flange 82 by additional fasteners 91.

The individual insulation cutting knives 8 are driven radially into engagement with the wire insulation by a camming ring 98 disposed in a circular recess or groove 96 on the side of the ring 92 which is against the face of the flange 82. Pins 100, which are fixed in the holders 88, extend parallel to the axis of the mounting sleeve through slots 102 in ring 92 and into camming slots 104 in camming ring 98, see FIG. 9. It will be apparent from FIG. 9 that upon rotation of the camming ring 98 in a counterclockwise direction from the position shown, the pins 100 will be moved radially towards the axis of the wire and will drive the insulation slitting knives 8 into the wire. Limited rotation of the camming ring 98 is achieved by means of the arm 106 integral with the camming ring and extending downwardly, as viewed in FIG. 9, through an opening 108 in the camming ring. The end of arm 106 has a pivotal connection 110 with a clevis on the end of a piston rod 112 extending from a pneumatic piston-ylinder 114. As will be explained below, the ring is rotated through a counterclockwise arc at the beginning of an operating cycle to drive the insulation slitting knives 8 into the wire insulation. The knives dwell in their inner positions while the wire is fed a short distance to form the axial slits 18. Thereafter, the ring 98 is rotated through a slight clockwise arc to withdraw the insulation slitting knives and permit feeding of the wire to the wire stripping station 11.

The insulation cutting and stripping blades 10 are held in blade holders 116 which in turn are slidably received in inclined grooves 118 on the rightwardly facing side of the flange 82, suitable retaining plates 120 being secured to the surface of the flange on the opposite side of the grooves 118 to retain the blade holders in position. The cutting blades 10 are driven inwardly toward the wire axis by means of pins 122 which are mounted in the blade holder and which extend leftwardly through radially extending slots 124 in the flange 82 and into camming slots 125 in a camming ring 126. This camming ring (FIG. 12) is contained in a circular recess 128 on the rightwardly facing side of flange 82 and has an arm 130 that extends through a recess 132 in the flange. The end of arm 130 has a pivotal connection 134 with a clevis on the end of a piston rod 136 extending from a piston cylinder 138. This piston cylinder is mounted on a suitable bracket secured to the flange 82 as indicated or shown in FIG. 12.

It will thus be apparent upon downward movement of the piston rod 136, the ring 126 will be rotated through a slight counterclockwise arc thereby to drive the pins 122 and insulation cutting and stripping blades 10 into engagement with the wire. Retraction of the piston rod, of course, causes withdrawl of the blades from the wire.

As previously explained, after the two pairs of insulation cutting and stripping blades 10—10, 10'—10', have moved from the position of FIG. 2 to the position of FIG. 3, the blades move toward each other to disengage the insulation from the wire. This axial movement of the insulation cutting and stripping blades is achieved by means of a lever 140 which is pivotally mounted at 142 adjacent to the frontal side of the apparatus. Lever 140 has an integral ring 152 intermediate its ends, and is pivoted at its rearward end 144 to a clevis 146 on the end of a piston rod 148 extending from a piston cylinder 150. The ring 152 surrounds a collar portion 153 of a sleeve 154 which is mounted on the reduced diameter section 76 of the mounting sleeve 72. Sleeve 154 is fixed to the mounting sleeve between the leftwardly facing shoulder 80 and a suitable lock nut 158 as shown best in FIG. 8. The ring 152 is pivotally connected by upper and lower pins 156 to the collar 153 as previously described so that when the lever 140 is swung through a slight clockwise arc (as viewed in FIG. 6) about its pivotal axis 142, the sleeve 154 and the mounting sleeve 76 will be moved rightwardly. During such rightward movement of the mounting sleeve, the lefthand pair of insulation cutting and stripping blades 10—10 are moved rightwardly. During the same portion of the operating cycle, the righthand pair 10'—10' of insulation cutting and stripping blades are moved leftwardly by corresponding structural elements on the opposite side of the apparatus. A stop ring 159 is mounted on the sleeve 154 adjacent to the collar portion 153. This stop ring engages the face of vertical frame member 32 to limit leftward movement of sleeve 154.

In order to assist in removal of certain types of insulation which are particularly adherent to the wire, it is desirable to provide the previously identified brushes 160 which move downwardly after a conclusion of the wire and cutting operations by the cutting and stripping blades 10, 10'. Some types of insulation will drop free from the wire after the blades 10, 10' have moved towards each other and flexed the insulation as shown in FIG. 5 while other types of insulation may be sufficiently adherent to remain on the wire after this operation has been carried out.

The brushes 160 are mounted on the ends of arms 164 which extend from a link 161. The link 161 is a member of a parallel bar linkage 166 which is coupled to a piston rod 170 of a pneumatic piston cylinder 712. This mechanism is actuated at the end of the operating cycle so that the brushes move downwardly then upwardly past the zone from which the insulation is to be stripped.

As previously noted, the wire is fed for a very short distance relative to the insulation slitting knives 8 while the knives are in engagement with the insulation to form axially extending slits 18. Thereafter, and after the slitting knives 8 are withdrawn, the wire must be fed a slightly greater distance to locate the axial slits between the insulation cutting and stripping blades 10. The feeding mechanism for effecting these two short feeding operations will now be described with reference to FIGS 13 and 15.

During these feeding operations, the wire is clamped between a pair of clamping blocks 174, 175 positioned at the righthand end of the apparatus as viewed in FIGS. 6 and 7. The block 174 is mounted on the end of an arm 176 which extends from a slide member 178 described below.

The clamping block 175 is mounted on the end of a bell crank plate 192 which is pivoted at 194 to a bracket 196 on the arm 176. Bell crank plate 192 is also pivoted at 198 to a link 200 which depends from, and has a pivotal connection 202 with, a clevis on the end of a piston rod 204 extending from a piston cylinder 206 on the upper side of the arm structure 176. A connecting and guide link 208 is also pivoted to the link 200 intermediate its ends and to the upper ends of the bracket 196. It will be apparent from FIG. 13 that upon leftward movement of the piston rod 204, the clamping block 175 will be swung outwardly for a short distance and will disengage from the wire thereby to permit feeding of the wire.

Referring now to FIG. 15, the slide 178 is mounted on guide rods 182 extending between vertical frame members 184, springs 180 being interposed between these vertical frame members and the slide to dampen the motion of the slide at the end of its stroke.

Slide 178 is moved in two stages by means of pneumatic piston cylinders 183, 185 which are in alignment with, and have their adjacent heads secured to each other. The piston cylinder 183 has a piston rod 186 that is secured to the lefthand frame member 184 and the piston cylinder 185 has a piston rod 187 which is secured to a transversely extending portion 191 of the slide. It should be noted that the piston cylinder 183 extends through an opening in the lefthand transversely extending portion 193 of the slide.

At the beginning of the operating cycle, the parts will be in the positions of FIG. 15 with the slide 178 at the leftward limit of its stroke and the pistons 195, 197 of the piston-cylinders 183, 185 as shown. After the insulation slitting knives have been moved into engagement with the wire insulation, the lefthand side of the piston-cylinder 206 is pressurized to clamp the wire. Thereafter, the righthand side of the piston cylinder 183 is pressurized to cause rightward movement of the slide 178 for a distance equal to the stroke of the piston cylinder 183. It is during this portion of the cycle that the axial slits are formed in the wire. Thereafter, the lefthand side of the piston cycle 185 is pressurized and the piston rod 187 moves outwardly from the cylinder to move the slide 178 and feed the wire from the slitting station 9 to the insulation removing station 11. The cylinders 183, 185 remain stationary during this latter feeding stroke.

As previously explained, the structural parts on the righthand side of the apparatus are similar in many respects to the structural parts on the lefthand side described above. It should be noted, however, (FIG &) that the righthand side does not have insulation slitting knives and does not have a part corresponding to the knife holder ring 92. A single plate 95' may be mounted against the rightwardly facing side of the flange 82' to retain the camming ring 126' in its recess in flange 82'. It will also be apparent from FIG. 7 that the collet 34', the sleeve 48', and the mounting sleeve 72' need not be as long as the corresponding structure elements 34, 48, 72 on the opposite side of the machine.

It will be understood that the apparatus is intended to be used with an additional wire feeding apparatus of any desirable type which is arranged to feed wire through the apparatus between adjacent strip zones. This main feeding apparatus would be actuated between operating cycles of the apparatus.

The operation of the disclosed embodiment is as follows - At the beginning of the operating cycle, the parts will be in the positions of FIGS. 2, 6, and 7 with the insulation slitting knives 8 and the insulating cutting blades 10, 10' retracted from the wire. Suitable pneumatic logic will be provided to energize the several piston cylinders at the desired times in the operating cycle to carry out the operating cycle described below. At the beginning of the operating cycle, the piston cylinder 114 is first pressurized on its lefthand side as viewed in FIG. 9 to rotate the camming ring 98 through a slight counterclockwise direction and drive the insulation slitting knives inwardly into engagement with the wire. The piston cylinder 206 will remain pressurized during the entire operating cycle so that the wire will be stripped between the clamping blocks 174, 175. After the insulation slitting knives have been driven into the wire insulation, the piston cylinder 183 is pressurized to move the clamping blocks rightwardly as viewed in FIG. 6 for a short distance thus forming the axially extending slits in the wire. Thereafter, the right-hand end of the piston cylinder 114, is pressurized to return the camming ring 98 to its original position and withdraw the slitting knives from engagement with the wire. The piston cylinder 185 is then pressurized to drive the clamping blocks 174, 175 a further distance rightwardly and feed the wire until the axial slits are prositioned between the insulation cutting and stripping knives, 10, 10'. At this stage of the operating cycle, the collets 34 are closed onto the wire by relative movement of the clamping sleeves 48 away from each other and rearwardly over their respective collets. The wire will thus be gripped tightly at each side or on each side of the cutting and stripping zone during the operations which follow. The insulation cutting knives 10 and 10' are then moved into engagement with the wire to form circumferential cuts at each end of the slits 18 by pressurizing piston cylinders 138 and while the knives are in engagement with the wire, the piston cylinders 150, 150' are pressurized to move the knives towards each other and flex the insulation. The pressure is relieved from the piston cylinders 150, 150' so that the insulation cutting and stripping knives return to their initial positions and the brushes 160 are then moved downwardly and upwardly past the wire to brush the segment of the insulation from the wire if they have not already fallen free.

Finally, the sleeves 48 are returned to their starting positions to disengage the collets 34 from the wire and to permit feeding of the wire by veined feeding means as described above.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. Apparatus for stripping insulation from the metallic core of a wire at a location intermediate the ends of the wire, said apparatus comprising:
   wire supporting means for supporting an intermediate portion of said wire in an operating zone,
   a plurality of insulation slitting knives in said zone, said knives being normally spaced from said wire and being movable radially towards, and into the insulation of, said wire,
   means for causing relative axial movement of said wire with respect to said knives while said knives extend into said insulation thereby to form axial slits in said wire,
   insulation cutting blade means for circumferentially cutting said insulation at each end of said axial slits, thereby to form a plurality of separate insulation segments and,
   means for flexing said segments thereby to separate said segments from said metallic core.

2. Apparatus as set forth in claim 1 wherein said slitting knives are axially spaced along said wire at a predetermined distance from said insulation cutting blade means, said apparatus including means for feeding said wire said predetermined distance after forming of said slits.

3. Apparatus as set forth in claim 1 wherein said insulation cutting blade means comprises two sets of insulation cutting blades, each of said sets comprising two blades, the two blades of each set being normally in opposed relationship on opposite sides of said wire, the two blades of each set being movable towards said wire to cut said insulation.

4. Apparatus as set forth in claim 3 including means for moving said sets of blades towards each other along said wire, said sets comprising said means for flexing said segments.

5. Apparatus for stripping insulation from a wire intermediate the ends thereof comprising:
   frame means,
   wire supporting means on said frame means for supporing a portion of said wire,
   insulation slitting means on said frame means, said insulating slitting means being located in an insulation slitting zone and being operative to form a plurality of axially extending slits of predetermined length in said insulation,
   first and second sets of insulation cutting and removing blades, said sets being located in an insulation cutting and removing zone which is spaced from said insulation slitting zone, the blades of each set being on opposite sides of said wire and said first set being spaced from said second set by a distance which is no greater than said predetermined length.
   first blade moving means for moving the blades of each set towards said wire to circumferentially cut said insulation,
   second blade moving means for moving said sets towards each other,
   wire advancing means for axially advancing said wire through said frame means for a distance equal to the distance between said insulation slitting zone and said insulation cutting and removing zone, and
   actuating means for sequentially actuating said insulation slitting means, said wire advancing means, said first blade moving means, and said second blade moving means whereby, axially extending slits are formed in said wire in said insulation slitting zone, said wire is advanced to locate said slits in said insulation cutting and removing zone, said insulation is circumferentially cut at each end of said slits and the portion of insulation between said slits is removed upon movement of said pairs of blades towards each other.

6. Apparatus as set forth in claim 5 wherein said wire supporting means comprises a pair of aligned collets.

7. Apparatus as set forth in claim 5 wherein said wire supporting means comprises first and second aligned collets, said insulation slitting means being on said first collet, each of said first and second sets of insulation cutting and removing blades being on one of said collets.

8. Apparatus as set forth in claim 5 wherein said insulation slitting means comprises a plurality of insulation slitting knives, said knives being mounted on said wire supporting means and being movable radially towards said wire and into the insulation thereof, and means for causing relative axial movement of said wire with respect to said knives to form said slits.

9. A method of stripping insulation from wire intermediate the ends of the wire, said method comprising the steps of:
supporting a portion of said wire including the zone from which insulation is to be stripped,
forming a plurality of axially extending slits in said insulation in said zone,
circumferentially cutting through said insulation at each end of said zone to form a plurality of separate insulation segments in said zone, and
flexing said segments to separate said segments from said wire.

* * * * *